Dec. 8, 1936.    A. AMES, JR    2,063,015
EYE TESTING INSTRUMENT
Filed June 20, 1932    3 Sheets—Sheet 2
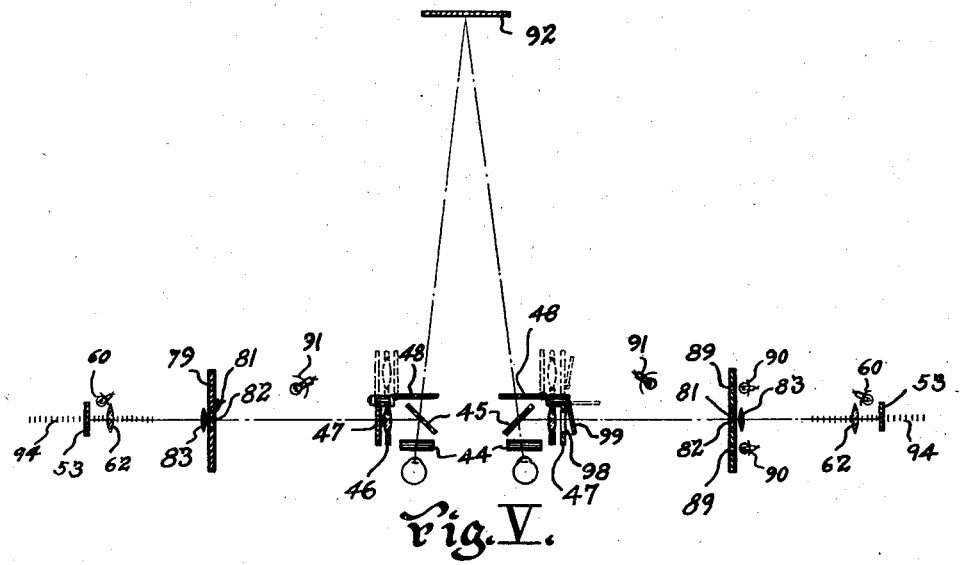
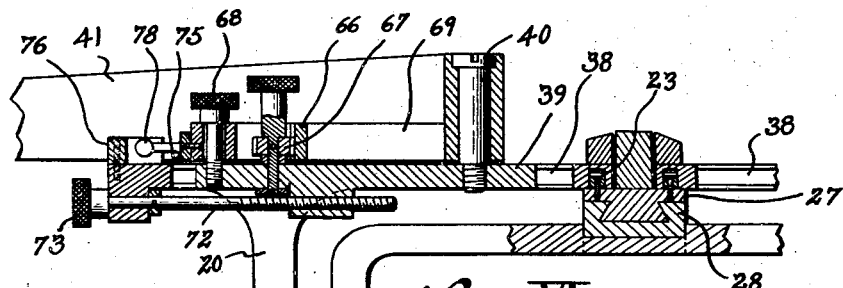
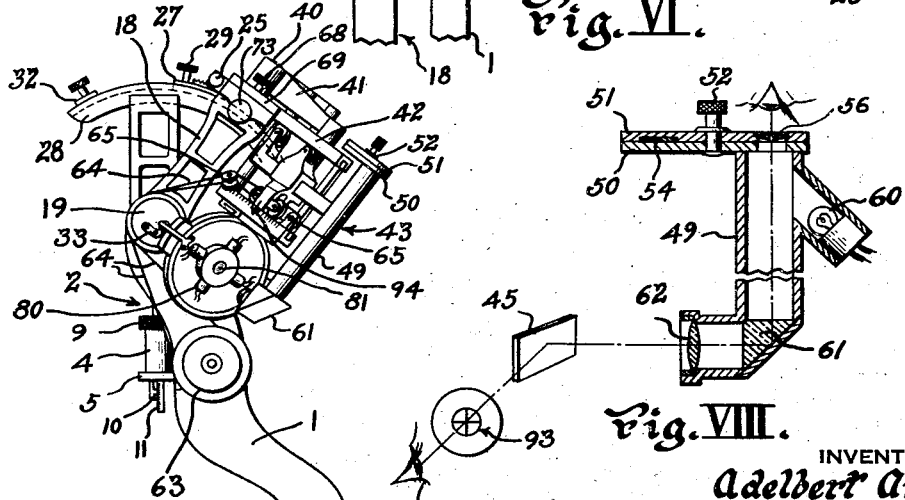
INVENTOR
Adelbert Ames Jr.
BY
Harry H. Styll
ATTORNEY Dec. 8, 1936.  A. AMES, JR  2,063,015
EYE TESTING INSTRUMENT
Filed June 20, 1932  3 Sheets-Sheet 3
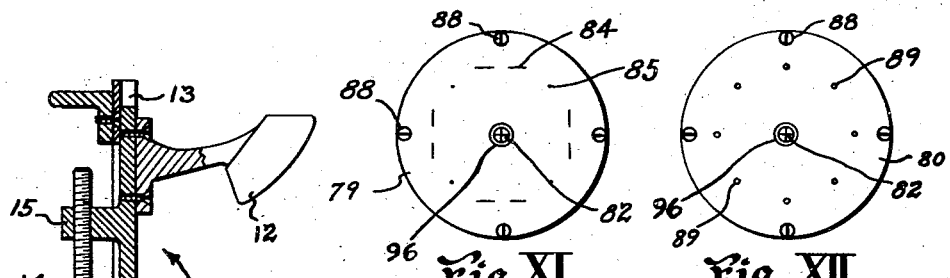
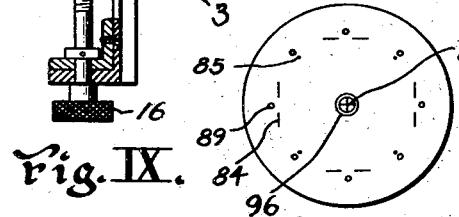
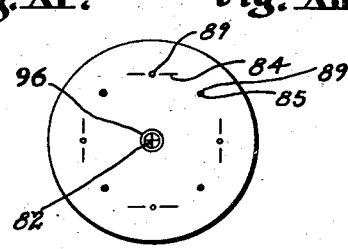
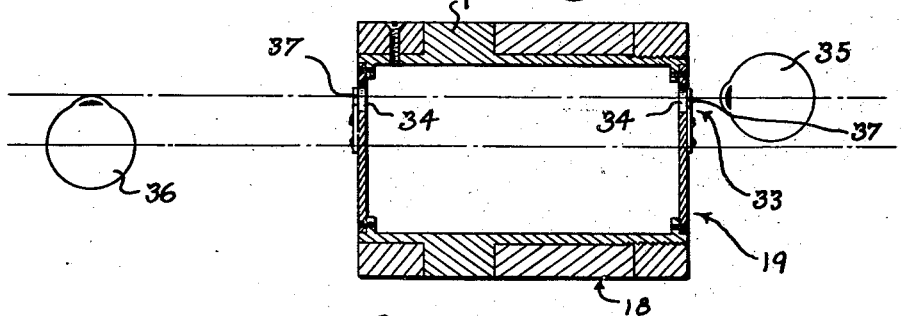
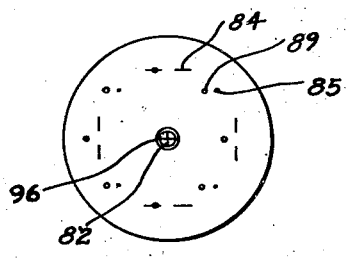
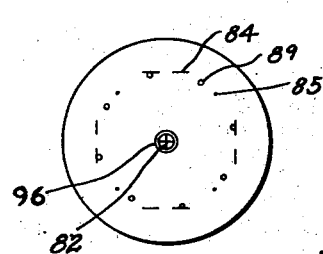
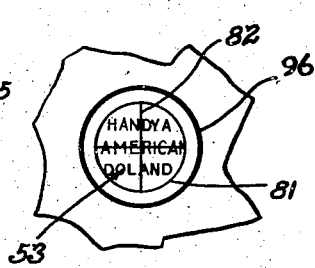
INVENTOR
Adelbert Ames Jr.
BY
Harry H. Styll
ATTORNEY Patented Dec. 8, 1936

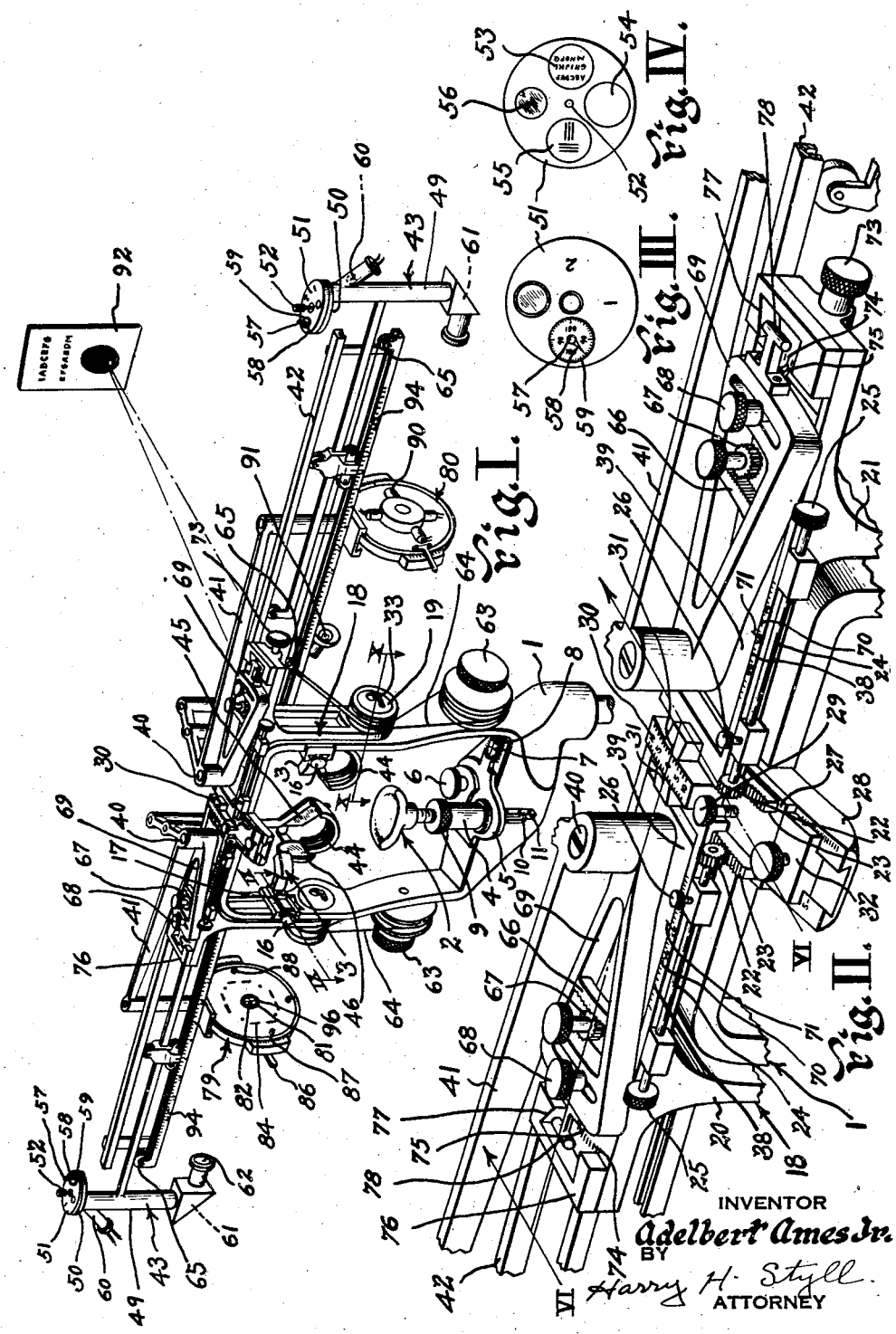

2,063,015

UNITED STATES PATENT OFFICE 2,063,015

EYE TESTING INSTRUMENT

Adelbert Ames, Jr., Hanover, N. H., assignor to trustees of Dartmouth College, Hanover, N. H., a corporation of New Hampshire Application June 20, 1932, Serial No. 618,200

44 Claims. (Cl. 88—20)

This invention relates to improvements in eye testing devices and has particular reference to improved methods and means of determining the nature and extent of certain defects of the human eyes and of correcting said defects.

Generally speaking, the present invention is an improvement of the testing instrumentalities and methods described and claimed in my Patent No. 1,946,925 of February 13, 1934, entitled Clinical optical mensuration instrument, and in Patent No. 1,944,871 of January 30, 1934, to Adelbert Ames, Jr. and Gordon H. Gliddon, entitled Clinical optical mensuration method and instrument, which are concerned with the testing of eyes for various conditions, as refractory, muscular, and ocular image size defects. The refractory and muscular defects are conventional and quite well known, whereas the discrepancies in size and shape of the ocular images of a pair of eyes, herein also referred to as "size defects", are described in the above-mentioned Patent No. 1,944,871, in Patent No. 1,933,578 of November 7, 1933, to Adelbert Ames, Jr. and Gordon H. Gliddon, entitled Eyeglasses for correcting retinal image asymmetry, and in various publications, as for example the "Transactions of the Section on Ophthalmology of the American Medical Association, 1928". In the course of applicant's investigations of ocular defects, it was found that these defects vary considerably in different positions of the eyes (the positions for distant vision and for reading being of primary importance) and methods and apparatus for carrying out comparative tests of the aforementioned defects under such conditions constitute one of the principal features of the present invention.

In another important aspect, the invention makes possible the movement of testing apparatus about horizontal as well as vertical axes through the center of rotation of the eyes, which feature, in conjunction with means for positively and reproducibly positioning the eyes of a patient, permits the carrying out of certain new testing methods.

Another feature involves a peculiar arrangement in the same line of vision, of instrumentalities for directly measuring the refractory conditions of the eyes, and of charts for determining muscular and size defects. This device, together with the aforementioned arrangement, permits the simultaneous determination of refractory, muscular and size conditions at the different above referred to visualization distances and positions of the eyes relatively to the head. All these tests are carried out in such a manner that rays from every visualized object fill the entire area of the pupil of the eye receiving these rays.

In still another aspect, the invention provides an arrangement of two test objects in the same line of vision which permits relative adjustment in such a manner that either object may be nearer to the eye.

The principal object of the invention is therefore to provide an improved test for determining and correcting differences of the size and shape of the ocular image of one eye relative to that of the other, either alone or simultaneously with determining and/or correcting the refractive and muscle condition of the eyes.

Another object is to provide an improved test for determining and correcting differences of the size and shape of ocular images, of all errors of refraction and phoria whether associated or disassociated, and of the amplitudes of human eyes in varying positions at which the eyes are actually used.

Another object is to provide a simple, efficient and inexpensive instrument of the above character having its various adjustment controls placed where they may be easily manipulated by the patient or the operator and by means of which the above mentioned tests may be made in a manner especially suitable for clinical purposes.

Another object is to provide for accurately positioning each eye relative to the test means prior to the examination thereof.

Another object is to provide an improved head support having means thereon which, when the head and therefore each eye of an individual is accurately positioned relative to the test means of the instrument, the locations of the various parts of said head support may be recorded so that they may be quickly readjusted to the requirements of that individual in the future.

Another object is to provide improved means for preventing the forming of similar marginal images in both eyes.

Another object is to provide more accurate means of determining the refractive condition of each eye, or both eyes, while the eyes are converged at a certain angle, as for example by fixing them on a target at a determined distance.

Still another object is to provide an arrangement of test lenses and test objects relatively to the eyes which permits especially accurate and simple tests.

Other objects and advantages of this invention will become apparent from the following description taken in connection with the accompanying drawings, and it will be understood that many changes may be made in the arrangement and details of parts and in the order and steps of the processes described without departing from the spirit of the invention as set forth in the accompanying claims. I, therefore, do not wish to be limited to the exact details shown and described as the preferred forms only have been shown by way of illustration.

Referring to the drawings:

Fig. I is a perspective view of the device embodying the invention;

Fig. II is an enlarged fragmentary perspective view of the upper central portion of the instrument shown in Fig. I;

Fig. III is a plan view of a portion of the test means shown in Fig. I;

Fig. IV is a plan view of the under side of the member shown in Fig. III;

Fig. V is a diagrammatic plan view of the device embodying the invention;

Fig. VI is a sectional view taken on line VI—VI of Fig. II, looking in the direction indicated by the arrows;

Fig. VII is a side elevation of the device shown in Fig. I showing the testing head of the instrument tilted forwardly and downwardly as when testing the eyes at substantially reading position;

Fig. VIII is a diagrammatic sectional view illustrating a step in the process of aligning the eyes relative to the test parts of the instrument prior to the eye examination;

Fig. IX is an enlarged sectional view taken on line IX—IX of Fig. I, showing a forehead rest and its means of adjustment;

Fig. X is an enlarged diagrammatic sectional view taken on line X—X of Fig. I, showing the corneal aligning means and its application;

Fig. XI is a front elevation of the left test chart;

Fig. XII is a front elevation of the right test chart;

Fig. XIII is a diagrammatic view illustrating the appearance of the images of the test objects to a normal eye;

Fig. XIV is a diagrammatic view illustrating the appearance of the images of the test objects to eyes which have a defect known as exophoria;

Fig. XV is a diagrammatic view illustrating the appearance of the images of the test objects to an eye having a defect known as cyclophoria;

Fig. XVI is a diagrammatic view illustrating the appearance of the refractive test means when in focus to the eye under test; and Fig. XVII is a diagrammatic view illustrating the appearance of the images of the test objects to eyes having an over-all size difference, and no phorias.

Most devices for determining the nature and extent of certain defects of the human eyes, in the past, have been exceptionally cumbersome, limited in scope and in general inaccurate and impractical for clinical use. Devices of this character usually required the constant attention and cooperation of the examiner, required much time in making the tests and the results thereof, due to the confusing methods and complicated means employed, depended mostly upon the intelligence of the individual being examined.

It is, therefore, one of the primary objects of the invention to overcome the above defects by providing simple, accurate and inexpensive means for testing the eyes of an individual in a manner particularly adapted for clinical use and by means of which the judgment of the tests may be made more easily and accurately.

Another feature of the present invention is to provide an instrument of the above character having its various adjustment controls located in positions where they may be easily manipulated by the patient or the operator and also to provide means by which the eyes of the patient may be examined in varying positions at which they are actually used.

Referring more particularly to the drawings wherein like characters of reference designate like parts throughout the several views, the device embodying the invention comprises in detail a base 1 having an adjustable chin rest 2 and adjustable forehead rests 3 thereon for supporting the head of the patient in a fixed position during the tests.

The chin rest 2 is threadedly attached to an upright 4 carried by a plate member 5. The said plate member is adjustably attached to the base 1 by a thumbscrew 6 and may be adjusted to any lateral position relative to the base. The adjustments of the plate member and chin rest 2, either sidewise or toward and away from the patient, may be determined by the position of a suitable cross line indicator 7 relative to a two dimensional scale 8 on the base 1 of the instrument. The chin rest is adjusted upwardly and downwardly by turning the hand wheel 9 and the position thereof is determined by an indicator 10 relative to a scale 11. The object of this arrangement is to provide means whereby the adjustments for different individuals may be permanently recorded so that the head support can be quickly reset to the requirements of said individuals at different intervals in the future.

The forehead rests 3, as shown in Figures I and IX, may be adjusted by moving the forehead engaging member 12 longitudinally of a slide support 13. The adjustment is obtained by means of a threaded rod 14 which is threadedly connected at 15 to the slide support and which is rotated by means of a thumb-piece 16. Suitable indicator and scale means 17 are provided to permit the resetting of the forehead rest to the requirements of different individuals as the occasions arise. Although separate adjustments are shown for the chin rest and forehead rests, it is to be understood that the said members may be constructed to be adjusted simultaneously if desired.

A U shaped bracket member 18 pivoted at 19 to the base frame 1 is adapted to support the entire test mechanism of the instrument and allow the same to be tilted vertically so that the eyes may be tested in varying positions at which they are actually used, that is, both distant and near positions. The U shaped bracket 18 is separated into two sections 20 and 21 which may be separately moved about their respective pivots 19 if desired or clamped together for movement as a unit about the pivots. The separate adjustment of each of the sections 20 and 21 as shown in Fig. II is accomplished by the movement of a pinion 22 relative to a rack 23. The pinion 22 in each instance is mounted on a shaft 24 attached to each of the upper parts of the sections 20 and 21 and is rotated by means of a thumb wheel 25. A lock screw 26 is provided for securing the pinion 22 against rotation after the desired adjustment is made. The pinion 22 is adapted to cause its respective section 20 or 21 to move about its pivot 19 and thereby causes the various parts attached to the said section to be tilted forwardly or rearwardly. The rack 23 for each section is attached to a plate 27 which is slidably mounted in an arcuate slideway 28. The adjustment of this plate 27 longitudinally of the slideway 28 causes the sections 20 and 21 to move about the pivots 19 as a unit. A thumbscrew 29 is adapted to lock the plate 27 against sliding movement after the desired adjustment is made. It is apparent that by loosening the lock screw 29 that both of the sections 20 and 21 will be moved as a unit rearwardly or forwardly about their pivots 19. The amount of movement of the plate 27 on the slideway 28 about the pivots 19 is determined by a scale in degrees on slideway 28. By first tightening the thumbscrew 29 and thence loosening the lock screw 26 on each section 20 and 21 as previously stated above and by rotating the thumb wheels 25, the said sections 20 and 21 may be separately adjusted about their pivots 19. The amount of the separate adjustment is determined by the scale 30 and the position of each indicator means 31 relative to said scale. A suitable stop 32 is provided at each end of the arcuate slideway 28 to limit the amount of tilting movement of the test means. Attention is directed to the fact that the axes of the pivots 19 are adapted to pass through the horizontal centers of rotation of the eyes. To definitely bring about this result each of the pivots 19 is provided with corneal aligning means 33. As shown in Figures I and X the pivots 19 are hollow in structure and are provided with aligned sight openings 34 through which the eye 35 of the examiner may view the eye 36 of the patient. Suitable aligning points 37 are provided adjacent the openings 34 to provide means with which the front surface of the corneas of the patient's eyes may be aligned. The distance of these aligning points from the axes of the pivots 19 is such that when the said points are aligned with the corneas of the eyes the said pivot axes will pass through the horizontal centers of rotation of said eyes.

The members 20 and 21 are provided with a slideway 38 in which a slide plate 39 is mounted. Pivotally mounted at 40 to each of the slide plates 39 is a laterally extending arm 41. These arms are adapted to support laterally extending slideways 42 on which is slidably mounted refractive test means 43. The arms 41 as shown in Figures I and V are also adapted to support trial lens cells 44, projection lenses 46 and a plurality of shields 47 and 48 before the eyes of the patient. Arm 41 further supports mirrors 45, which are arranged at appropriate angles to reflect the light rays from the laterally arranged test means into the direct line of vision of the eyes. These various elements are shown diagrammatically in Fig. V.

The placing of the trial lenses in holders 44 between eyes and mirrors allows the use of standard power test lenses with their markings, and avoids an excessive magnification resulting from a comparatively great distance of the lenses from the eyes. Further, if these lenses are in the path of the light rays coming from both, fixation means (as for example target 92) and test object (for example lamp 61), the distance of the point conjugate to the retina can be read directly from scale 94 without adding or substracting the power of the corrective lens, which is necessary if the latter is placed between mirror and fixation object.

The refractive test means 43 as shown in Figures I, III, IV, and VIII, comprises a tubular member 49 having a plate 50 attached adjacent one end thereof. The said plate has a disc 51 pivotally attached thereto as indicated at 52. The disc 51 is provided with test type 53, a white spot 54, an astigmatic chart 55 and a sight opening 56. The astigmatic chart is rotatable about a pivot 57 and suitable indicator means 58 and a degree scale 59 is provided to determine the axis of rotation. Each of the members 53 to 56 inclusive are separately alignable with the tubular member 49 for selective use as illustrated in Fig. VIII. Suitable illuminating means 60 is provided for illuminating the various test charts. Adjacent the opposite end of the tubular member 49 there is provided a prism reflector 61 which is adapted to deflect the light rays along the sight line of the instrument. A projection lens 62 adjacent the end of the tube 49 is adapted to project an aerial image of the test means to be visible to the eye under examination. The position of the aerial image with respect to the eye is varied by moving the test means 43 longitudinally of the slide 42. The test means 43 is operated by a hand wheel 63 positioned adjacent the head of the patient. The said hand wheel is connected to the test means 43 by a cord 64, which passes over a plurality of idler pulleys 65.

Each arm 41, as shown in Fig. II, is moved about its respective pivot 40 by means of a rack 66 and pinion 67. Lock screw means 68 is provided to secure the said arms in desired adjusted positions. The rack 66 in each instance is attached to a side arm 69 formed on each of the members 41 and the operating pinions 67 for moving said arms are mounted on the slide plates 39 on which the arms 41 are pivotally attached. It is apparent therefore that by rotation of the pinion 67 the arm 41 will be moved about its pivot 40. The pivots 40 are adapted to pass through the vertical axes of rotation of the eyes when the said eyes are in aligned position in the head rest. This is accomplished by adjusting each slide plate 39 longitudinally of its slideway 38 until the pivots 40 are separated an amount equal to the pupillary distance of the patient. The amount of separation is determined by the position of the indicator 71 relative to the scale 70. The slide plate 39 as shown in Figures II and VI, is adjusted longitudinally of the slideway 38 by means of a threaded shaft 72 and thumb wheel 73. The amount of angling in prism diopters of the arms 41 about their pivots 40 as shown in Fig. II, is determined by the scales 74 and indicator means 75 formed adjacent the ends of the side arms 69.

When the distance between the pivots 40 is changed to that of the pupillary distance of the patient the angle of the arms 41 carrying the test charts must be changed in order to preserve a given vergence angle. To accomplish this result there is provided a plate 76 attached to the end of the slide way 38. This plate 76 is provided with an angled face 77 which is of such an angle that it will automatically cause a contact member 78 attached to the side arm 69 to move the arm 41 the necessary amount about the axis 40 when the slide plate 39 is moved longitudinally of the slideway 38. This amount is such that it will compensate for the variation in the vergence angle of the eyes at different pupillary distances. The plate member 76 is attached to the instrument in such a manner that it may be readily detached if desired.

For the purpose of obtaining a test of the size and shape of ocular images, phorias and fusional amplitudes there is provided a pair of charts 79 and 80. These charts are attached to the arms 41 at a fixed distance with respect to the pivots 40 and are adapted to be moved about said pivots to varying angular positions relative to the eyes. The test chart 79, as shown in Figs. I, V and XI, is provided with a central opening 81 in which is mounted a cross line transparent fixation member 82 and a lens 83. The lens 83 is adapted to prevent a change in the size of the ocular image of the test means 53 when the position thereof is changed with respect to the eye of the patient. An illustration of the appearance of the cross line fixation means 82 and test means 53 when in focus to the eye under test is illustrated in Fig. XVI. Surrounding the opening 81 is a fixation ring 96. This is to provide additional fixation means at the center of the test chart 79. At opposite sides of the central opening 81 in both the horizontal and vertical meridians, there is provided a plurality of spaced lines 84. These lines are preferably black on a white background formed on the face of the chart. A black spot 85 is formed at the 45° meridians between the horizontal and vertical test lines 84 to provide additional test means. The chart 79 is provided with an adjusting member 86 by means of which it may be rotated about the opening 81 as its center of rotation. This is to permit the spaced lines 84 and dots 85 to be moved to different meridians. The amount of movement is determined by suitable scale and indicator means 87 adjacent the side of the test chart. The chart 79 is also provided on its horizontal and vertical meridians with slotted pin members 88 to which a thread line may be attached if desired. This is to form cross line fixation means on the face of the chart for use in making tests such as for cyclophoria or cyclo-fusional amplitudes.

The chart 80 at the right of the instrument, as shown in Figures I and XII, is similar in structure to that of the chart 79 only in this instance, instead of the lines 84, the chart is provided with a plurality of pin hole openings 89. The said pinhole openings are located on opposite sides of the central opening 81 in both the vertical and horizontal meridians and at the 45° meridians intermediate said vertical and horizontal meridians. Each pin hole opening 89 is provided with illuminating means 90 on the side thereof away from the patient. This arrangement forms bright spots or stars visible to the right eye and provides means which, during the tests, are adapted to be matched with the spaced lines on the chart 79 at the left of the instrument. The appearance of the charts when in matched relation is shown in Fig. XIII.

If the patient is orthophoric and has no size or shape differences, the images of both eyes should be in superimposed relation, both horizontally and vertically as illustrated in said Fig. XIII. In this case, as well as in the case when the eyes are abnormal, the patient looking in the instrument fuses the like marks 82, 96, but has no tendency to fuse the unlike marks 84, 89, respectively, of the two targets 79 and 80. Since these unlike marks are on either target similarly disposed with respect to the like marks, the former will coincide, as in Fig. XIII, if the eyes have no defect, or if they have no size defect and the refractory and/or muscular defects are eliminated.

The front of the test charts 79 and 80 is illuminated by suitable illuminating means 91 as shown in Figures I and V.

A fixation object 92 placed approximately 20 feet away from the patient is adapted for use when distant tests are made. When the fixation object 92 is used, a plus lens 46 is placed between the eyes and the test means 43 or test objects 79 and 80 as the case may be to effectively place them at said 20 foot distance from the eyes.

When the 40 centimeter or reading test is made as shown in Fig. VII, the complete testing parts of the instrument are tilted forwardly and downwardly in the vertical meridian about the pivots 19 as previously stated. The arms 41 carrying the test objects 79 and 80 and test means 43 are swung forwardly about the pivots 40 to obtain the desired vergence angle or to place the test means in a plane approximately normal to the line of sight of each eye or at a position wherein the center 81 of the test charts 79 and 80 coincides in the median plane at a distance of 40 centimeters or the approximate reading distance.

To more accurately determine whether or not the eyes of the patient are in desired position relative to the test means prior to making the tests a transparent member having a central cross line and ring marking 93 thereon, as shown in Fig. VIII, is placed in the lens holders 44 before the eyes of the patient. The observation opening 56 with its lens in the plate 52 is then rotated into axial alignment with the tubular member 49 so that the examiner may view the position of the pupil of the patient's eye with respect to the circle and cross line marking 93 before said eye. If the pupil does not properly align with the circle and cross line marking 93 the adjustments are altered until this condition exists.

Some of the various tests accomplished by the instrument are as follows:

The refractive condition of the eye is tested by placing the head of the patient in desired aligned position relative to the testing apparatus of the instrument. The refractive condition of the eyes may be tested either when one eye only is being used or when both eyes are being used in binocular vision with fusion. If only one eye is being used the test is as follows. The test means 53 is placed in aligned relation with the tubular member 49 so that it is visible to the eye under test. The view of the eye not under test is shielded by screen members 47 and 48 such as shown in Fig. V. The patient is then told to observe the cross line fixation means 82 and to operate the hand wheel 63 until the image of the test type 53 is clear as shown in Fig. XVI. The position at which the patient obtains clear vision is determined by a scale 94 formed on the side of the laterally extending slideway 42. This scale indicates whether or not the refractive condition of the eye is normal or abnormal and definitely determines the amount of refractive error if any exists. If the image of the test object 53 is projected to a plane in front of the fixation chart 79 or 80, as the case may be, or to the side thereof towards the eye under test, it indicates that the image is focused in front of the retina and that the eye is myopic for that particular fixation distance. This shows that a minus correction of the amount indicated on the scale 94 is necessary. If the image is positioned at the rear of the fixation object 79 or 80, as the case may be, it indicates that a plus correction of the amount indicated is necessary.

It is to be understood that the above mentioned test is made while the eye under test is fixed upon the cross line fixation means 82, and that each eye is tested separately.

When the refractive condition of the eyes is being tested while both eyes are being used in binocular vision with fusion the test is as follows.

In determining the refractive condition at near the test charts 79 and 80 are so placed that their centers 81 coincide at 40 centimeters, screens 47 having been removed to allow each eye to see its respective target and screens 48 being interposed to cut off the view from in front. The test means 53, consisting of lines of print is then placed in aligned relation to the tubular member 49 so as to be visible to the eye under test. Before the other eye, the test means 54 consisting of white paper is placed. The eyes fuse the circles and cross lines 82 at the centers of the targets and their vergence and fixation are thereby held. The patient is then told to observe the cross line fixation means 82 and to operate the hand wheel 63 until the image of the test type 53 is clear as shown in Fig. XVI. The refraction of the other eye is determined in a similar manner.

In determining the refractive condition for a distance the screens 48 are removed so the patient can look through the mirrors at a fixation target 92 at a distance of 20 feet. The test means 53 is then placed in alignment with the eye under test. The illumination is turned off of the targets 79 and 80. The patient sees only the fixation target at 20 feet and the test means 53 superposed thereon. The patient then operates the hand wheel 63 until the image of the test type 53 is clear.

The test for astigmatism is accomplished in a manner similar to that set forth above in connection with refraction only in this instance the astigmatic chart 55 is aligned with the tubular member 49 so that it is visible to the eye under test. The astigmatic chart is first rotated to the axis of astigmatism and is then moved back and forth along the line of sight of the instrument to a position wherein one group of lines is clear and distinct and is then moved back and forth until the other group of lines is clear and distinct. The position at which each group of lines is clear and distinct as determined by the scale 94 indicates the astigmatic interval and its position.

The tests set forth above are preferably made before the eyes are tested for size and shape, and also before the phoria tests are made but it is to be understood that they may be made at any time desired.

The method of determining associated phoria is as follows:

In cases of exophoria or esophoria or that condition of the eye in which the image of one target shifts to the right or left of the image of the other target as shown in Fig. XIV, so called horizontal slip or fixation disparity the arms 41 and attached test charts 79 and 80 are swung about their pivots 40 until the lines 84 on the chart 79 and stars 89 on the chart 80 coincide with each other as shown in Fig. XIII. It will now be understood that Figs. XIII, XIV, and XV represent appearances with binocular vision, of the test charts when no size difference exists, or, if present, has already been corrected with appropriate corrective lenses inserted in lens holders 44. If an image size difference exists, and it is not desired to correct it at this stage of the test, the arms are rotated about their horizontal and vertical axes 19 and 40, respectively, and the targets are rotated about their center 81, until the lines and stars appear symmetrical about the fixation object, as in Fig. XVII. If this is the case, the eyes are so positioned that no horizontal or vertical phorias are present, and cyclophoria is compensated. The amounts of the target movements necessary to produce this symmetrical appearance of the unlike, but similarly placed target marks measure the amounts of the phorias. The amount of change of vergence through the movement of the charts, necessary to correct this exophoric or esophoric condition is determined by the position of the indicator 75 relative to the scale 74. The vertical fixation disparity or slip is determined by shifting the arms 41 and attached test charts 79 and 80 about the pivots 19. This test is accomplished by loosening the set screws 26 and turning the thumb wheels 25 an amount sufficient to cause the said arms 41 to move about their respective pivots 19 until the images of the test objects coincide with each other. The amount of movement necessary to bring about alignment of images is indicated by the scale 30 and indicator means 31.

All of the above conditions are effected by correcting the refractive condition of the eyes and also by correcting the relative size differences and in some cases by the use of prisms.

Cyclophoria or that condition wherein the image of one target is rotated off axis with respect to the image of the other target, as shown in Fig. XV, is determined as mentioned above by rotating the test charts 79 and 80 about the hole 81 as the center of rotation until the images are in proper alignment. This figure shows the appearance of the targets when only cyclophoria but no linear phorias or size differences are present, or have already been eliminated. The amount of movement necessary to bring about this alignment is determined by the position of a suitable indicator relative to the scale 87 adjacent the edge of each test chart. This adjustment is accomplished by the patient by grasping the lever 86 at the side of the chart and rotating the said chart until the images are in desired aligned relation with each other. These conditions are also effected by correcting the errors of refraction and size differences. Cyclophoria can be corrected by appropriate means, as for example by special cyclophoria mirror lens devices such as shown and described in Patent No. 1,908,296 to Adelbert Ames, Jr. and Gordon H. Gliddon, of May 9, 1933, entitled "Optical correction of cyclophoria."

Disassociated phoria is determined by the use of dissimilar test objects before the eyes and by the amount that each test object must be adjusted relative to the other to cause the dissimilar images of said test objects to superimpose. The difference between this test and the associated phoria test is that in this instance no means is provided for obtaining fusional fixation. The determination of disassociated phoria is similar to that set forth above in connection with associated phoria.

One method of determining phoria when the eyes are disassociated is accomplished with applicant's device through the provision of separate screens having totally dissimilar nonfusible center marks thereon. These screens are adapted to be placed over the test objects 79 and 80. The amount of phoria is determined by the number of prism diopters vertically or horizontally or both through which one of the targets must be moved in order to cause the two dissimilar center points to coincide. The amount in prism diopters of the vertical adjustment is determined by the scale 30 and of the horizontal adjustment by the scale 74.

In obtaining the horizontal fusional amplitude the arms 41 are moved about the pivots 40 until a point is reached where the images on the test objects 79 and 80 break, that is, the arms 41 are moved in or out to the limit at which fusion can be maintained. The amount in or out is determined by the scales 74. The fusional amplitude in the horizontal meridian for each eye separately may be obtained by moving the target of the eye under test while the target of the opposite eye is fixed, that is, for example, if the fusional amplitude of the left eye is being tested, the left target is moved in or out until the limits in these respective positions are reached. The right eye in this particular instance remains fixed. To determine the fusional amplitude of the right eye, the action is merely reversed.

The vertical fusional amplitude is obtained in a similar manner to that of the horizontal by moving the arms 41 about the pivots 19. The amount of the movements is determined by the scale 30.

The cyclo-fusional amplitude is obtained by first placing a thread line in the horizontal meridian of the test charts 79 and 80 as previously described. The charts 79 and 80 are then rotated about the center opening 81 as the center of rotation until the line images break, that is, the targets are rotated until a point is reached wherein fusion can no longer be maintained. The amount of movement is determined by the scale 87. The limits in this instance are obtained on both sides of the horizontal meridian by rotating the lines to the breaking point at the opposite sides of said meridian. The cyclo-fusional amplitude of each eye separately is obtained by moving the target of the eye under test while the target for the eye not under test remains fixed. For example, to obtain the cyclo-fusional amplitude of the left eye, the left target is moved while the target for the right eye remains fixed. The cyclo-fusional amplitude of the right eye is obtained in a similar manner by causing the left eye to remain fixed during the movement of the right target. Difference of these conditions of the eyes is effected by correcting refractions and size differences or by special cyclophoria mirror lenses which permit the images of both eyes to be balanced.

The variation in the size and shape of images or that condition wherein the image of one eye is larger than the other as shown in Fig. XVII, either over all or in different meridians is effected by correcting the errors of refraction and also by the use of special no power magnifying or reducing lenses or special no power cylindrical lenses. These lenses and their applications are shown and described in Patent No. 1,933,578 to Adelbert Ames, Jr., and Gordon H. Glidden, of November 7, 1933, entitled Eyeglasses for correcting retinal image asymmetry.

Fig. XVII indicates the appearance of the test charts when only image size discrepancies exist, or when other defects have already been eliminated. In carrying out size tests, the side arms are brought into positions corresponding to convergence for distant vision, or approximately twenty feet, that is the distance of target 92, the eyes looking straight forward. By means of appropriate plus lenses 46, as described above, the targets are effectively placed at that distance. The fusible marks are now perceived as a single object, whereas the non-fusible, unlike objects are perceived separately. If they appear to be placed in a manner not indicating the presence of phorias only, or if they do not coincide after phorias have been corrected, a size defect is present and can be corrected, and its amount measured by means of the above-mentioned corrective lenses. It is evident that any size and shape defect, be it overall, meridional, or combined, can be evaluated in this manner. The instrument is then tipped about axis 19, the arms converged to reading distance, as described above, for example for carrying out refractive tests, the eyes fusing objects 82 which maintain vergence and fixation. The size test is then carried out as for distant vision.

The above mentioned tests for refractory, muscular and size and shape defects are all obtained when the eyes are positioned as in actual use and can be carried out together. The principal positions at which these tests are made are at a distance causing relaxed accommodation, as for example an effective distance of 20 feet when the eyes are looking straight ahead and when the eyes are looking down as in reading, for example at a distance of 40 centimeters. The findings from these various tests determine the nature and interdependency of the various defects and the extent of the correction required.

Attention is directed to the fact that the mirrors 45 employed in deflecting the images of the test means into the line of sight of the patient are transparent and permit the eyes to view the fixation object 92. This, of course, could be accomplished by the use of half silvered mirrors or mirrors having a sight opening therein or some other suitable arrangement.

To produce dissimilar marginal images in both eyes during the various tests the screen 47 at the right of the instrument is provided with a circular opening 98 through which the test means 43 or 80 are visible. The screen in this instance is provided with a hinged flap 99 by means of which the opening 98 may be closed when the view of the eye is to be shut off.

It will be evident that, as in the instrument described in the above-mentioned Patent No. 1,944,871, similar targets can be used for both eyes, for example by using for each eye a target having a pattern according to Fig. XI or XII. In this manner, certain tests involving amplitude values of binocular vision could be carried out by changing ocular image sizes with the aid of trial lenses, which tests, however, give only rather approximate results.

From the foregoing description it will be seen that I have provided simple, accurate and inexpensive methods and means of accomplishing all of the objects and advantages of the invention in a manner more particularly adapted for clinical use.

Having described my invention I claim:

1. In a device of the character described, the combination of means for fixing the patient's eyes, test means positioned out of the field of direct vision of an eye under test, and optical means within the direct field of vision of the eye under test to afford vision of the test means, said test means and said optical means being supported for pivotal movement substantially about the vertical and horizontal centers of rotation of the eye.

2. In a device of the character described, the combination of means for fixing the patient's eyes, test means positioned out of the field of direct vision of each eye, and means interposed in the field of direct vision designed to deflect light rays to afford vision of the test means, said test means and said deflecting means being supported for pivotal movement substantially about the vertical and horizontal centers of rotation of each respective eye.

3. In a device of the character described, the combination of test means including visualization objects for testing the eyes of the patient at varying positions at which they are actually used, means for supporting the test means for rotatory movement horizontally and vertically relative to the eyes and means for adjusting the axes of rotation so that they pass substantially through the horizontal and vertical centers of rotation of the eyes.

4. In a device of the character described, the combination of means for positioning the eyes of the patient relatively to the device, test means including visualization objects for testing the eyes of the patient and means for supporting the test means for movement effectively about axes each passing substantially through the horizontal centers of rotation of both eyes and about vertical axes passing substantially through the vertical centers of rotation of the eyes.

5. In a device of the character described, the combination of adjustable means for reproducibly fixing the position of the head of the patient relatively to the device, test means including visualization objects for testing the eyes of the patient at varying positions at which they are actually used, means for supporting the test means effectively for movement relative to the eyes about horizontal and vertical axes, and means for adjusting said axes so that each horizontal axis passes substantially through the horizontal centers of rotation of both eyes and the vertical axes pass through the vertical centers of rotation of the eyes.

6. In a device of the character described, the combination of means for positioning the eyes of a patient relatively to the device and supporting means for each eye having fixation means and separate variable test means, each supporting means being mounted for effective movement substantially about the vertical and horizontal centers of rotation of an eye under test.

7. In a device of the character described, the combination of means for supporting the head of the patient for reproducibly positioning the eyes of the patient relatively to the device, test means arranged to be visible to the eye under test, said test means being supported for pivotal movement substantially about a vertical axis, and means for moving the pivot axis to accommodate for the pupillary distance of the patient and to a position wherein said axis passes substantially through the vertical center of rotation of the eye.

8. In a device of the character described, the combination of means for supporting the head of the patient, test means arranged to be visible to the eyes under test, said test means being supported for pivotal movement substantially about the vertical centers of rotation of the eyes, means for moving the pivot axes to accommodate for the pupillary distance of the patient and to position said axes in alignment with the vertical centers of rotation of the eyes and means cooperating with said pivot axis moving means for automatically changing the relation of the test means an amount sufficient to compensate for the variation in the vergence angle for different pupillary distances.

9. In a device of the character described, the combination of test means arranged to be visible to the eyes under test, said test means being supported for pivotal movement substantially about the vertical centers of rotation of the eyes, means for moving the pivot axes to accommodate for the pupillary distance of the patient and to position said axes in alignment with the vertical centers of rotation of the eyes, and means cooperating with said pivot axis moving means for automatically changing the relation of the test means an amount sufficient to compensate for the variation in the vergence angle for different pupillary distances.

10. In a device of the character described the combination of means for positioning the eyes of a patient with separate substantially similar test means for each eye mounted one on each side of said positioning means for effective movement substantially about the horizontal centers of rotation of the eyes.

11. In a device of the character described the combination of means for positioning the eyes of a patient with separate substantially similar targets for each eye mounted one on each side of said positioning means, said targets having similarly arranged test objects, means for the apparent visual superposition of said test objects, and means for effective movement of said targets substantially about the horizontal centers of rotation of the eyes.

12. In a device of the character described, the combination of test means including visualization objects for testing the eyes of the patient at varying positions at which they are actually used, means for supporting the test means for rotatory movement relative to the eyes about horizontal axes, and means for adjusting the axes of rotation so that they pass substantially through the centers of rotation of the eyes.

13. In a device of the character described, the combination of test means including visualization objects for testing the eyes of the patient at varying positions at which they are actually used and means for binocular fixation of the eyes, means for supporting the test means for rotary movement relatively to the eyes about horizontal axes and means for adjusting said axes so that they pass substantially through the centers of rotation of the eyes.

14. In a device of the character described, the combination of means for positioning the eyes of the patient relatively to the device, test means including visualization objects for testing the eyes of the patient and means for supporting the test means for movement effectively about an axis passing substantially through the horizontal centers of rotation of both eyes.

15. In a device of the character described, the combination of means for positioning the eyes of a patient relatively to the device and supporting means for each eye having fixation means and separate variable test means, each supporting means being mounted for effective movement substantially about the horizontal center of rotation of an eye under test.

16. In a device of the character described the combination of a head support, separate substantially similar test means for each eye pivotally connected one on each side of the head support, means for moving the test means separately about their respective pivot axes and means for connecting the separate test means for movement as a unit about said axes.

17. In a device of the character described, the combination of a head support, separate substantially similar test means for each eye pivotally connected one on each side of the head support, means for moving the test means separately about their respective pivot axes, means for connecting the separate test means for movement as a unit about said axes and means for determining the amount of movement either separately or simultaneously.

18. In a device of the character described the combination of a head support, separate substantially similar test means for each eye pivotally connected one on each side of the head support, said test means being horizontally pivoted for vertical movement, means for moving the test means separately about their respective pivot axes and means for connecting the separate test means for movement as a unit about the horizontal pivot axes.

19. In a device of the character described the combination of separate test means connected one on each side of the device for rotation about horizontal axes through the centers of rotation of the eyes, means for moving the test means separately about their respective axes of rotation and means for connecting the test means for movement as a unit about the axes.

20. In a device of the character described, the combination of a head support and test means pivotally connected to said support, the said pivot having a sight opening therein at a given distance from its axis with which the cornea or other part of the eye may be aligned and by means of which the axis of the pivot may be located substantially coincident with the center of rotation of the eye.

21. A device for testing binocular vision comprising means for positioning the eyes of a patient, fixation object means for fixing the vergence of the eyes at a predetermined distance from the eyes, a test object means adjustable to various distances from an eye, means for causing apparent superimposition of the images of said fixation object means and said test object means, lens holding means on said eye positioning means between said superimposition means and said eye, and lens means in said holding means for determining the apparent distance between said eye and said object means.

22. A device for testing binocular vision comprising means for positioning the eyes of a patient, fixation object means visible to both eyes for fixing the vergence of the eyes at a predetermined distance from the eyes, a separate test object means adjustable to various distances from an eye, means for causing apparent superimposition of the images of said fixation object means and said test object means, lens holding means on said eye positioning means between said superimposition means and said eye, and lens means in said holding means for determining the apparent distance between said eye and said test object means.

23. A device of the character described comprising eye testing means, fixation means substantially in the same light path with said testing means and means for projecting along said path an aerial image of said testing means in varying positions relatively to the eye and said fixation means, said fixation means being apertured for simultaneous fixation of the eye and vision of said aerial image while it is moved into focus.

24. A device of the character described comprising eye testing means, fixation means substantially in the same light path with said testing means and means for projecting along said path an aerial image of said testing means in varying positions relatively to the eye and said fixation means, said fixation means being apertured for simultaneous fixation of the eye and vision of said aerial image, while it is moved into focus, with rays from each visible point of the aerial image filling the entire pupil of the eye.

25. A device of the character described comprising eye testing means, fixation means substantially in the same light path with said testing means, both testing and fixation means being positioned out of the undeviated line of vision of the eye under test, means in the direct line of vision of the eye under test to afford vision of said test and said fixation means, and means for projecting an aerial image of said testing means in varying positions relatively to the eye and said fixation means.

26. In a device of the character described the combination of means for definitely positioning each eye of a patient relatively to said device, and of fixation means and variable test means arranged to be viewed by the eye under test and substantially in the same light path, means for projecting an aerial image of said testing means in varying positions relatively to the eye and said fixation means, said fixation means being apertured for simultaneous fixation of the eye and vision of said aerial image while it is moved into focus, and means for moving said aerial image into focus and for determining the position thereof relatively to the eye fixed by said positioning means.

27. A device of the character described comprising fixation means and variable test means arranged to be viewed by the eye under test and substantially in the same light path, means for projecting an aerial image of said testing means in varying positions relatively to the eye and said fixation means, said fixation means being apertured for simultaneous fixation of the eye and vision of said aerial image, while it is moved into focus, with rays from each visible point of said aerial image filling the entire pupil of the eye, means for moving said aerial image into focus, and means for determining the position of said aerial image relatively to the eyes.

28. A device for testing binocular vision, comprising light deviating means before each eye, fixation objects sidewise of the eyes in lines of vision determined by said deviating means, a test object, and means for mounting said test object in one of said lines of vision for adjustment to various distances from an eye, one of the objects before an eye having a portion through which the other object before that eye may be observed by the eye, said fixation and test objects being different in appearance for distinction thereof during simultaneous observation, and said deviating means superposing the appearances of said fixation objects and, differentiated therefrom, of said test object.

29. In a device of the character described, means for positioning an eye, means for projecting an aerial image forming a test object positioned in the line of vision of said eye at a given distance from said positioning means, means for adjusting the distance between said positioning means and said test object, and a test target in the same line of vision having a traversable portion through which said object may pass visibly from one side of the target to the other upon adjustment of the object.

30. In a device of the character described, means for positioning an eye, a test object positioned in the line of vision of said eye at a given distance from said positioning means, means for adjusting the distance between said positioning means and said test object, and a test target in the same line of vision having a traversable portion through which said object may pass visibly from one side of the target to the other upon adjustment of the object.

31. A device according to claim 30 further characterized by means for measuring distances between the eye and said image.

32. A device according to claim 30 further characterized by means for measuring distances between the eye and said target.

33. A device according to claim 30 further characterized by means for rotating said target about said line of vision.

34. A device of the character described comprising an eye testing target, a fixation target substantially in the same light path with said testing target, means for moving the position of said testing target along said light path toward and away from the eye and said fixation target, one of said targets having a traversable portion through which said other target may pass visibly from one side of said target to the other upon adjustment relatively thereto of the other target.

35. In a device of the character described, a head support frame having a surface thereon, a plate having a flat surface in contact with said first surface and slidably mounted upon said first surface for lateral adjustment in any direction upon that surface, a chin rest mounted on said plate, and means for slidably adjusting and fixing said plate relatively to said first surface.

36. The device according to claim 35 in combination with a two dimensional scale and a mark associated with said surface and said plate for indicating the relative positions of said chin rest and said frame.

37. In a device of the character described, a head support frame having a surface thereon, a plate having a flat surface in contact with said first surface and slidably mounted upon said first surface for lateral adjustment in any direction upon that surface, a chin rest mounted on said plate, a forehead rest adjustable on said frame independently of said chin rest, and means for determining the extent of movement of said rests relatively to said frame.

38. A device for testing binocular vision, comprising a fixation object in the direct line of vision of both eyes, a target for each eye outside said direct line of vision, each target having a fusible object similar to the fusible object of the other target and non-fusible objects similarly arranged, but dissimilar to, the non-fusible objects of the other target, and a test object adjustable to various distances from an eye, in the indirect line of vision of one of said targets, and means for the apparent visual superposition of said fixation object, said targets and said test object.

39. A device for testing binocular vision, comprising fixation objects removed from the direct line of vision of each eye, a target in the indirect line of vision of each fixation object, each target having a fusible object similar to the fusible object of the other target and non-fusible objects similarly arranged, but dissimilar to, the non-fusible objects of the other target, and a test object adjustable to various distances from an eye, in the indirect line of vision of one of said fixation objects, and means for the apparent visual superposition of said fixation objects, said targets and said test object.

40. A device of the character described comprising means for positioning the head of a patient in predetermined position, means for testing eye defects at adjustable vergence distances from said positioning means, with rays from each visible point of said testing means filling the entire pupil of the eye receiving these rays, and means for rotating said testing means about a substantially horizontal axis through the centers of rotation of the eyes, for making tests at reading position with the eyes rotated downwardly and the head in unchanged position.

41. A device of the character described comprising means for positioning the head of a patient in predetermined position, means for testing dioptric, muscular and ocular image difference defects at adjustable vergence distances from said positioning means, with rays from each visible point of said testing means filling the entire pupil of the eye receiving these rays, and means for rotating said testing means about a substantially horizontal axis through the centers of rotation of the eyes, for making tests at reading position with the eyes rotated downwardly and the head in substantially unchanged position.

42. A device of the character described comprising means for positioning the head of a patient in predetermined position, means for testing the refractive defects of the eyes adjustable from an effective distance causing relaxed accommodation of the eyes to effective reading distance, means for measuring the focal distance of each eye separately with binocular fusion at either distance, with rays from each visible point of said testing means filling the entire pupil of the eye receiving these rays, and means for rotating said testing means about a substantially horizontal axis through the centers of rotation of the eyes, for making tests at reading position with the eyes rotated downwardly and the head in unchanged position.

43. A device of the character described comprising means for positioning the head of a patient in predetermined position, means for presenting the eyes with test target means adjustable from an effective distance causing relaxed accommodation of the eyes to effective reading distance and having for the respective eyes appearances whose ocular images can be differentiated for comparison thereof, and means for rotating said testing means about a substantially horizontal axis through the centers of rotation of the eyes, for making tests at reading position with the eyes rotated downwardly and the head in unchanged position.

44. A device of the character described comprising means for positioning the head of a patient in predetermined position, separate test means for each eye effectively positioned to cause relaxed accommodation, means for making only one test means visible to each respective eye, means for changing the apparent relative position of said test means for measuring phorias, and means for rotating said test means about a substantially horizontal axis through the centers of rotation of the eyes, for making tests with the eyes rotated relatively to the head which remains in substantially unchanged position.

ADELBERT AMES, Jr.